US012500784B1

(12) United States Patent
Dai et al.

(10) Patent No.: US 12,500,784 B1
(45) Date of Patent: Dec. 16, 2025

(54) AGENDA-BASED CONFERENCING SOFTWARE

(71) Applicant: Zoom Video Communications, Inc., San Jose, CA (US)

(72) Inventors: Wenzhang Dai, Tongcheng (CN); Chaofeng Wu, Fuyang (CN); Yangqing Zhang, SuZhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/646,246

(22) Filed: Apr. 25, 2024

(51) Int. Cl.
H04L 12/18 (2006.01)
H04L 65/1093 (2022.01)

(52) U.S. Cl.
CPC ...... H04L 12/1818 (2013.01); H04L 12/1831 (2013.01); H04L 65/1093 (2013.01)

(58) Field of Classification Search
None
See application file for complete search history.

(56) References Cited

U.S. PATENT DOCUMENTS

| | | | |
|---|---|---|---|
| 8,019,069 B1 | 9/2011 | Cyriac et al. | |
| 9,705,689 B1* | 7/2017 | Vander Mey | ........ G06Q 10/103 |
| 10,200,468 B2 | 2/2019 | Leban et al. | |
| 10,742,817 B1* | 8/2020 | White | .................... H04M 3/562 |
| 11,777,755 B2 | 10/2023 | Fahrendorff et al. | |
| 2005/0027800 A1 | 2/2005 | Erickson et al. | |
| 2006/0224430 A1 | 10/2006 | Butt | |
| 2007/0005408 A1 | 1/2007 | Boss et al. | |
| 2008/0147706 A1 | 6/2008 | Anglin et al. | |
| 2008/0226051 A1* | 9/2008 | Srinivasan | ............ H04M 3/567 379/202.01 |
| 2011/0107236 A1* | 5/2011 | Sambhar | ................ H04M 3/563 715/753 |
| 2012/0110475 A1 | 5/2012 | Han et al. | |
| 2014/0082100 A1* | 3/2014 | Sammon | .............. G06Q 10/101 709/204 |
| 2015/0356312 A1 | 12/2015 | Sato et al. | |
| 2015/0358371 A1 | 12/2015 | Abuelsaad et al. | |
| 2020/0219066 A1* | 7/2020 | Lin | ..................... G06Q 10/1095 |
| 2022/0060584 A1* | 2/2022 | Bhosle | .................. H04M 3/561 |
| 2022/0353468 A1* | 11/2022 | Walia | ...................... H04N 7/147 |
| 2023/0033104 A1* | 2/2023 | Geddes | ................. H04L 65/403 |

(Continued)

FOREIGN PATENT DOCUMENTS

CN 109544031 A 3/2019
CN 115002085 B 11/2022

Primary Examiner — Phyllis A Book
(74) Attorney, Agent, or Firm — Young Basile Hanlon & MacFarlane, P.C.

(57) ABSTRACT

A conferencing software receives, from a device of a conference invitee, a request to join a virtual conference. The conference invitee is associated with an agenda item of the virtual conference. Based on the request to join the virtual conference, the conferencing software adds the device to a waiting room associated with the virtual conference. The conferencing software determines whether a start time of the agenda item is within a predefined threshold time from a current time. In response to determining that the start time of the agenda item is within a predefined threshold from a current time, the conferencing software removes the device from the waiting room and adds the device to the virtual conference.

20 Claims, 10 Drawing Sheets

(56) References Cited

U.S. PATENT DOCUMENTS

| | | | |
|---|---|---|---|
| 2023/0036178 A1* | 2/2023 | Geddes | G06Q 10/1095 |
| 2023/0083350 A1* | 3/2023 | Swerdlow | G10L 15/10 |
| | | | 715/753 |
| 2023/0121137 A1* | 4/2023 | Munoz | H04L 12/1822 |
| | | | 709/224 |
| 2023/0289739 A1* | 9/2023 | Loftus | G06Q 10/1095 |
| 2023/0328119 A1* | 10/2023 | Roberts | H04N 21/47202 |
| 2023/0412411 A1* | 12/2023 | VanBlon | H04N 7/152 |
| 2024/0021217 A1* | 1/2024 | van Rensburg | H04N 7/157 |
| 2024/0089134 A1* | 3/2024 | Zhao | H04L 12/1818 |

* cited by examiner

TITLE: BI-WEEKLY EXECUTIVE MEETING

WHEN: OCCURS EVERY OTHER MONDAY OF THE MONTH

FROM: 3:00 PM  TO: 4:30 PM

☐ MAKE AGENDA VISIBLE/PUBLIC

INVITEES: *USER2*, USER10, USER15, *SHOW ALL...*

WAITING ROOM TYPE: ○ ONE WAITING ROOM
⦿ WAITING ROOM BY TOPIC
○ NO WAITING ROOM

| AGENDA ITEM | SUBMITTED BY | ALSO INVITE | URGENCY | REQUESTED TIME | REGISTERED INTEREST | ACCEPTED |
|---|---|---|---|---|---|---|
| TOPIC 1 | USER1 | USER3, USER4 | HIGH | 10 MINUTES | USER10 | ✓ |
| TOPIC 2 | USER2 | USER5, USER6 | MEDIUM | 20 MINUTES | USER10, USER11 | ✓ |

FIG. 8A

TITLE: WEEKLY TEAM MEETING

WHEN: OCCURS EVERY MONDAY 🗓

FROM: 3:00 PM 🕒   TO: 4:30 PM 🕒

☑ MAKE AGENDA VISIBLE/PUBLIC — 802

INVITEES: *USER2*, ≡ USER10, ≡ USER15, ⊗ *SHOW ALL...*

WAITING ROOM TYPE: ⦿ ONE WAITING ROOM — 810A
○ WAITING ROOM BY TOPIC — 810B
○ NO WAITING ROOM — 810C

| AGENDA ITEM | SUBMITTED BY | ALSO INVITE | URGENCY | REQUESTED TIME | REGISTERED INTEREST | ACCEPTED |
|---|---|---|---|---|---|---|
| TOPIC 1 | USER1 | USER3, USER4 | HIGH | 10 MINUTES | USER10 | ☑ |
| TOPIC 2 | USER2 | USER5, USER6 | MEDIUM | 20 MINUTES | USER10, USER11 | ☑ |

AGENDA-BASED CONFERENCING SOFTWARE

FIELD

This disclosure generally relates to conferencing software and, more specifically, to agenda-based conferencing software.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8A is an example of a user interface illustrating a configuration of a conference where the conference (or agenda) is configured as being private.

FIG. 8B is an example of a user interface illustrating a configuration of a conference where the conference (or agenda) are configured as being public.

DETAILED DESCRIPTION

Figure 1:
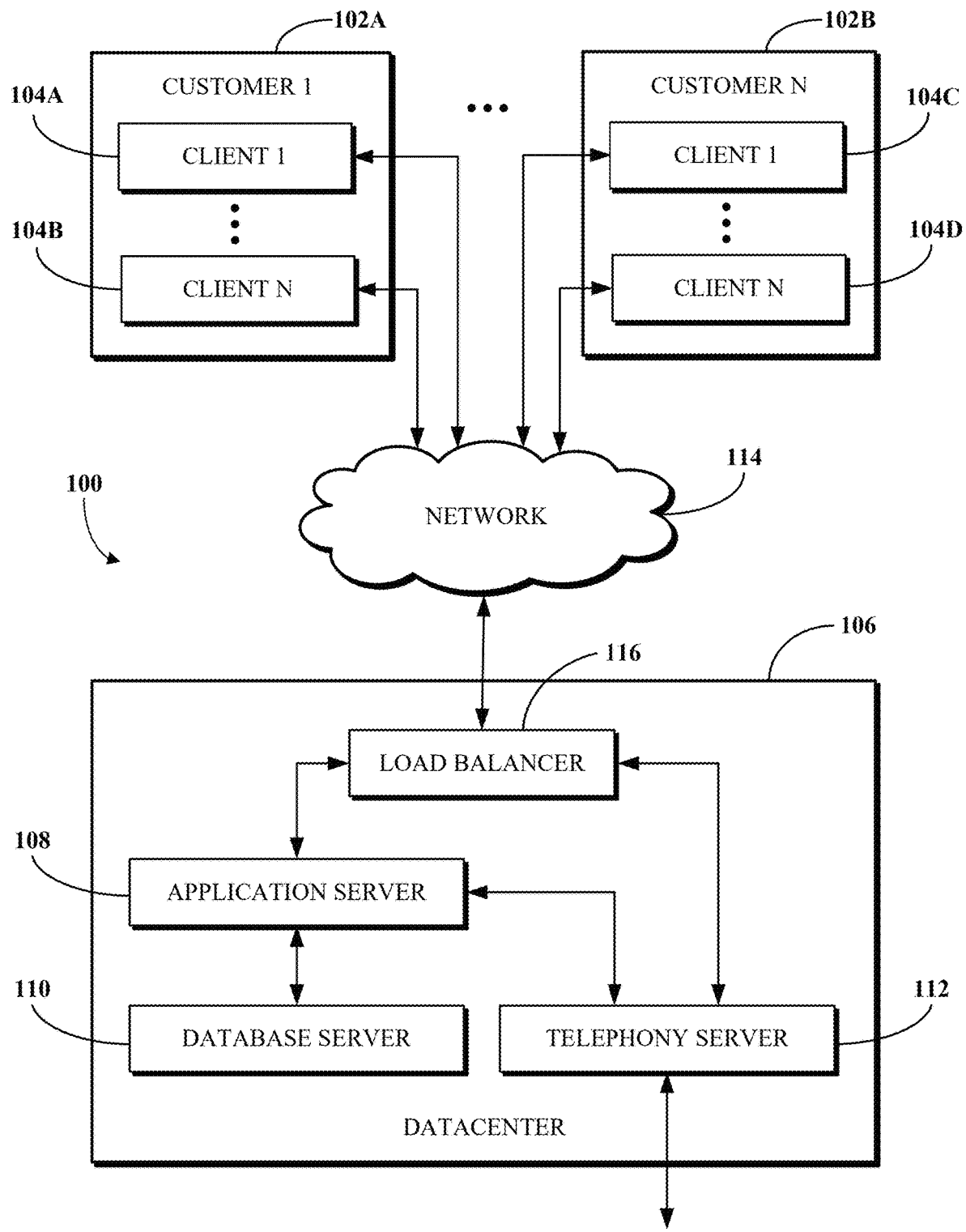
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct conferences (e.g., audio only or audio-visual conferences) without requiring them to be physically present with one another. Conferencing software may be available as a standalone software product or it may be integrated within a software platform, such as a unified communications as a service (UCaaS) platform.

In conventional conferencing software, an agenda that includes or lists agenda items (also referred to herein as topics) may be provided before or at the beginning of the conference and one of the participants (e.g., a host or a facilitator) may perform agenda management, such as by moving the discussion from item to item. The conventional conferencing software does not offer capabilities related to associating agenda items with conference participants. As such, in conventional conferencing software, the handling of agendas in meetings often follows a static and linear approach. A participant may join a virtual conference (e.g., meeting) from the beginning and remain throughout, even if their interest or contribution is limited to a specific agenda item. This approach stems from the lack of dynamic scheduling capabilities in conventional conferencing software, which does not support selective participation based on individual agenda interests. As a result, meetings tend to follow a predetermined sequence of topics, regardless of the varying relevance to each participant.

As such, the conventional approach to managing meeting agendas and participant engagement in virtual conferences is not optimal for several reasons. Firstly, they lead to significant time wastage, as individuals have to wait for the topics relevant to them to be discussed, without a precise schedule. Attendees are forced to sit through discussions that may not pertain to them, leading to inefficient use of their time. Participants either join the meeting early and passively wait, which is a poor use of their time, or repeatedly check with colleagues or superiors on the status of the meeting, thereby diverting their attention from other productive tasks. Additionally, the requirement for the host to manually invite participants for each subsequent topic not only adds administrative burden but also interrupts the flow of the meeting. These inefficiencies can dampen productivity, stifle creativity, and ultimately, contribute to meeting fatigue among participants, as exemplified when individuals multitask or disengage while awaiting their topics of interest.

The need for selective participation becomes especially apparent in diverse meeting scenarios. To illustrate, a recurring team meeting, scheduled by a manager, may operate like an open forum for various team members to discuss different topics. Prior to a meeting instance, the manager may gather topics (e.g., meeting agenda items), such as via email, from the team members. The manager may then distribute an agenda that dictates who should be present for which discussions. During the meeting, all team members typically attend and those presenters (or those interested in particular topics) simply wait until those topics are discussed. As another illustration, in more structured settings, where sensitive and privileged discussions are conducted, such as a bi-weekly meeting conducted by an executive (such as a Chief Operating Officer), only contributors relevant to an ongoing topic are invited to join, often leading to operational inefficiencies as the meeting must pause for these contributors to be manually contacted and joined. These illustrations highlight the inefficiencies and time wastage inherent in current practices, underscoring the need for a more dynamic and efficient approach to managing meeting participation.

Implementations according to this disclosure solve problems such as these via an agenda-based conferencing software configured to add (e.g., join) and remove user devices from conferences based on associations between users and agenda items and determined start and completion start times of the agenda items. As further described herein, a user device may be connected to a waiting room associated with a conference such that the user device does not have open communication channels to the conference. The user device is later removed from the waiting room and connected to the conference by opening one or more communication channels between the user device and the conference.

The agenda-based conferencing software enables dynamic scheduling of agenda items (e.g., topics) before the conference begins, enabling participants to indicate their interest in specific discussions (e.g., agenda items). The agenda-based conferencing software may notify participants shortly before their topics of interest are about to commence, allowing them to join the conference at the most relevant times. Accordingly, the agenda-based conferencing software can significantly reduce the time wasted waiting for relevant discussions and eliminates the need for manual intervention, such as by the host or a facilitator. Furthermore, the agenda-based conferencing software enhances the productivity of meetings by ensuring that participants are present at least for discussions that require their input or attention, thereby fostering a more focused and efficient meeting environment.

In some implementations, participants may join a conference at any time and are placed in a waiting room. When their agenda items of interest are to be discussed, they are moved from the waiting room to the conference. In some implementations, the agenda-based conferencing software may include a machine learning model trained to predict discussion durations, such as the end of discussion of a current agenda item, and adjust notifications accordingly. In some implementations, the agenda-based conferencing software may segment meeting recordings, such as by topic, for easy reference.

In some implementations, a conferencing software receives, from a device of a conference invitee, a request to join a virtual conference. The conference invitee is associated with an agenda item of the virtual conference. Based on the request to join the virtual conference, the conferencing software adds the device to a waiting room associated with the virtual conference. The conferencing software determines whether a start time of the agenda item is within a predefined threshold time from a current time. In response to determining that the start time of the agenda item is within the predefined threshold from the current time, the conferencing software removes the device from the waiting room and adds the device to the virtual conference.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/MNL systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/MNL processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for agenda-based conference management. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
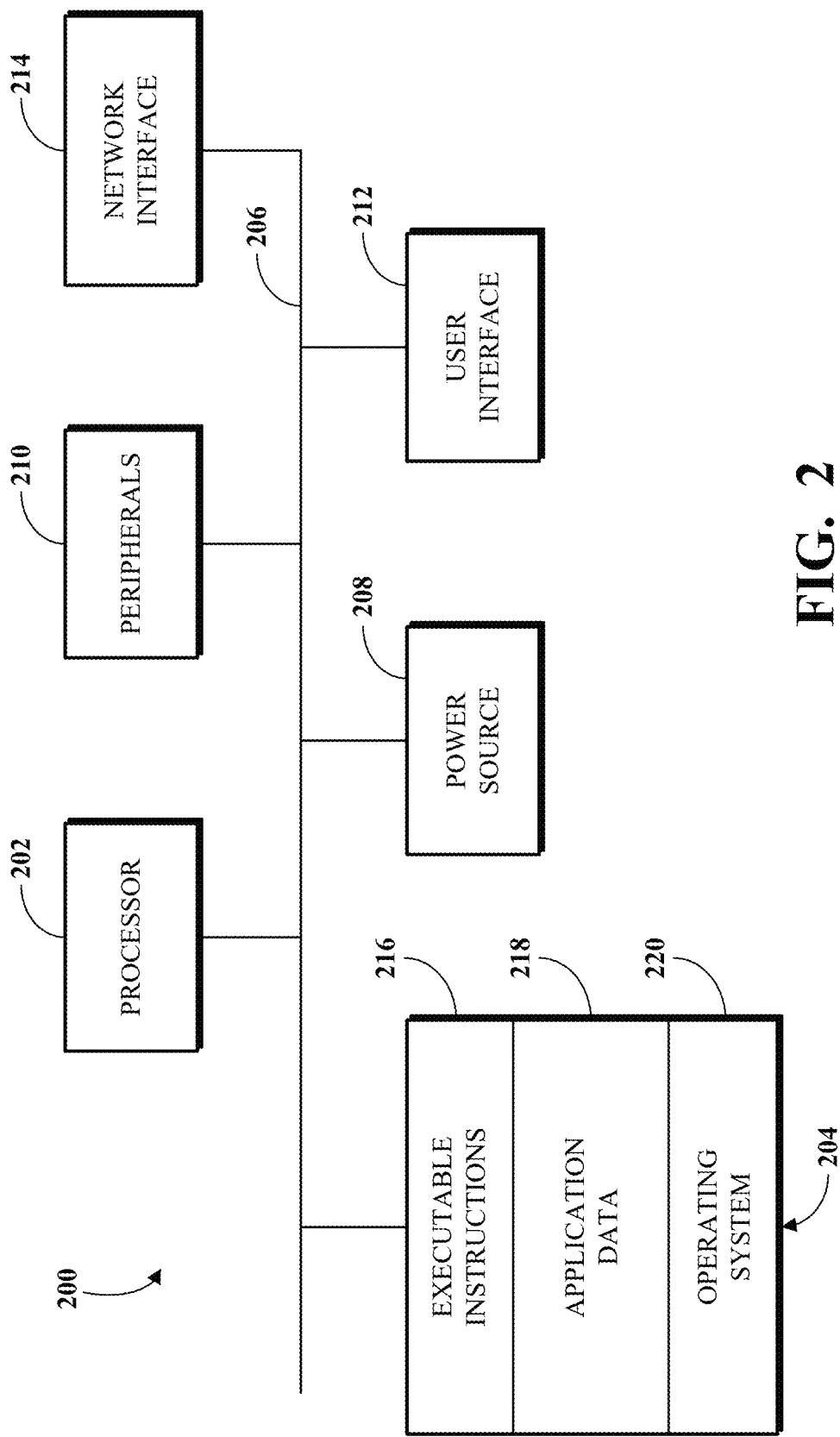
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
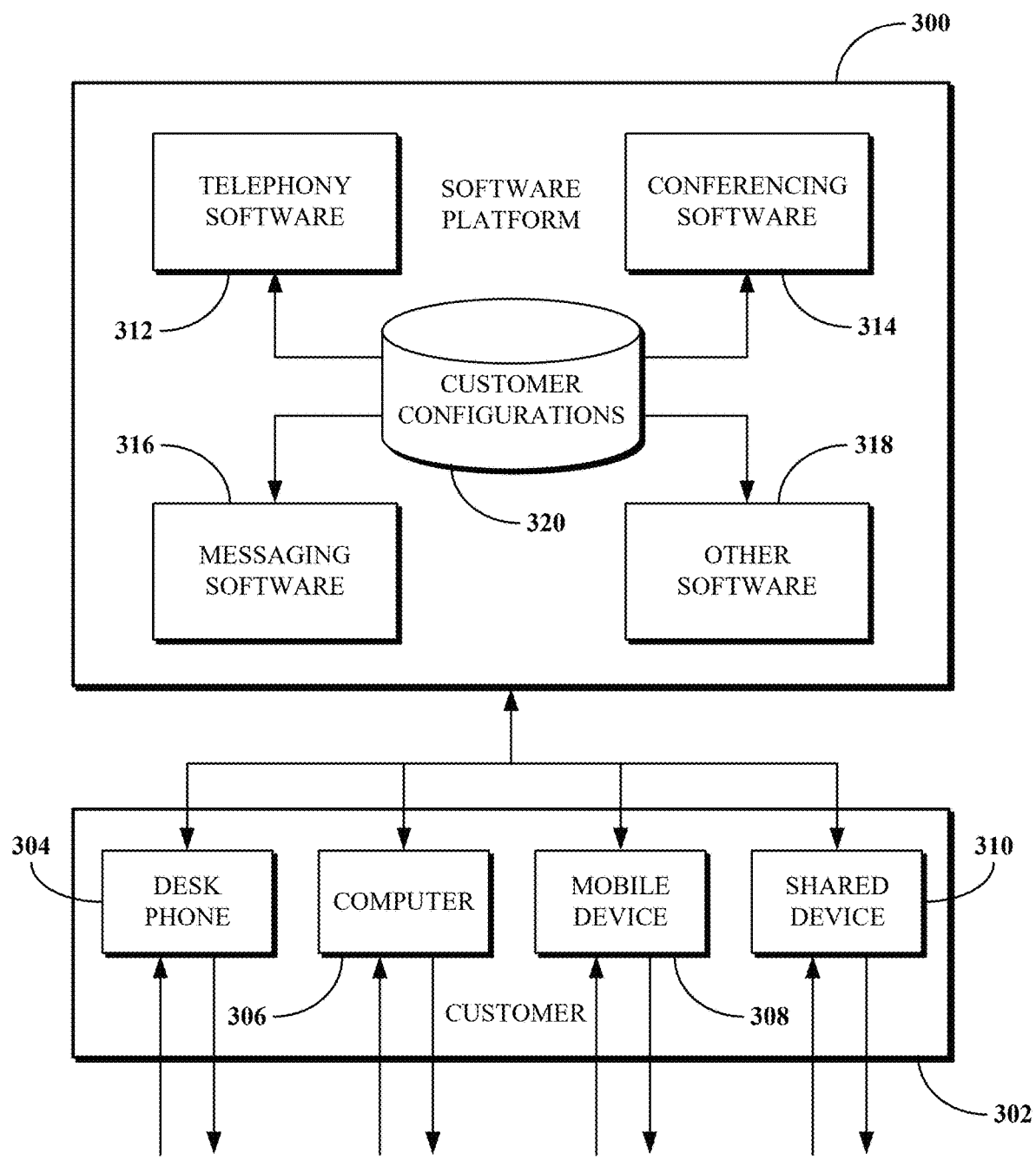
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include an agenda-based conferencing software. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
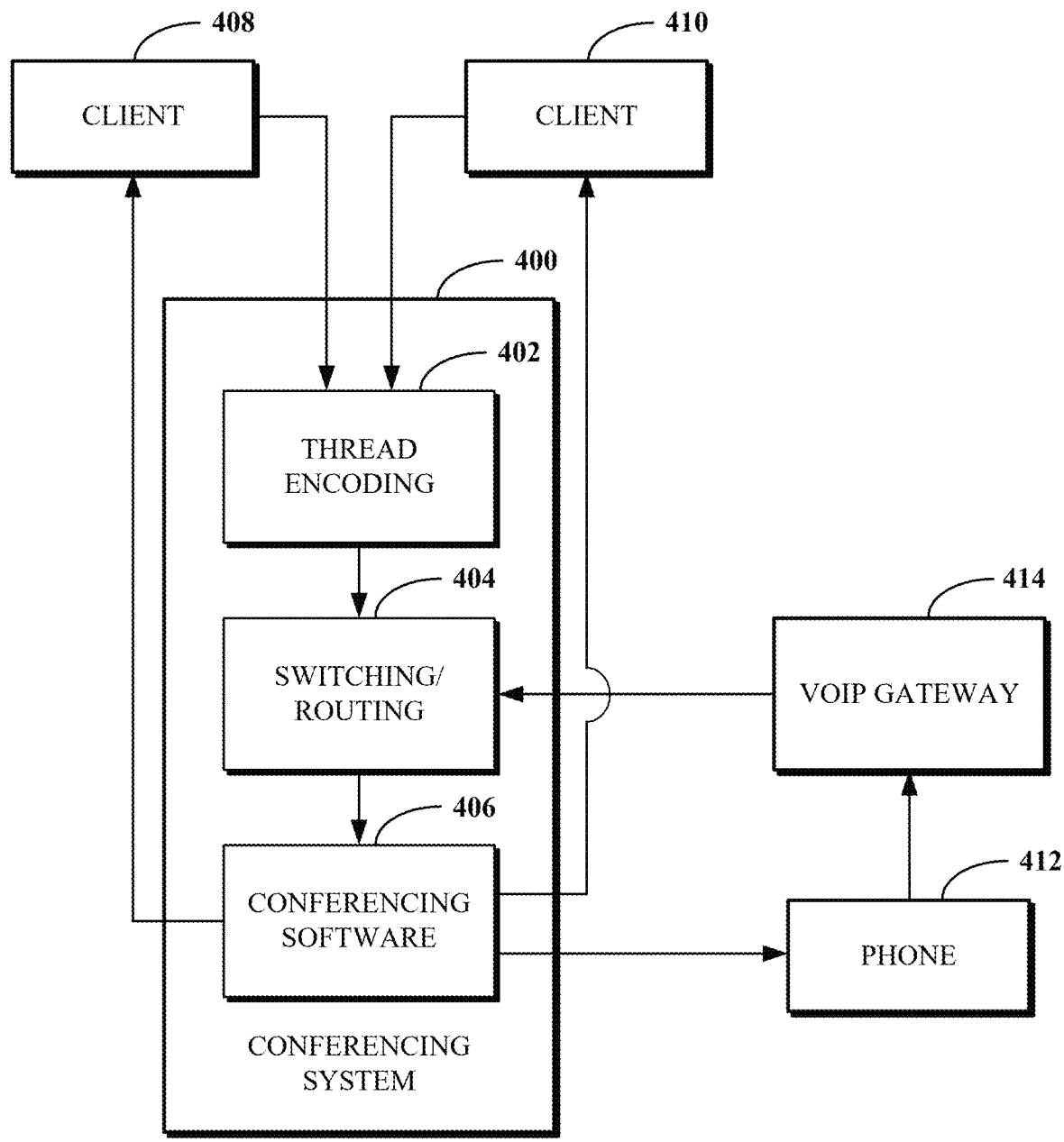
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
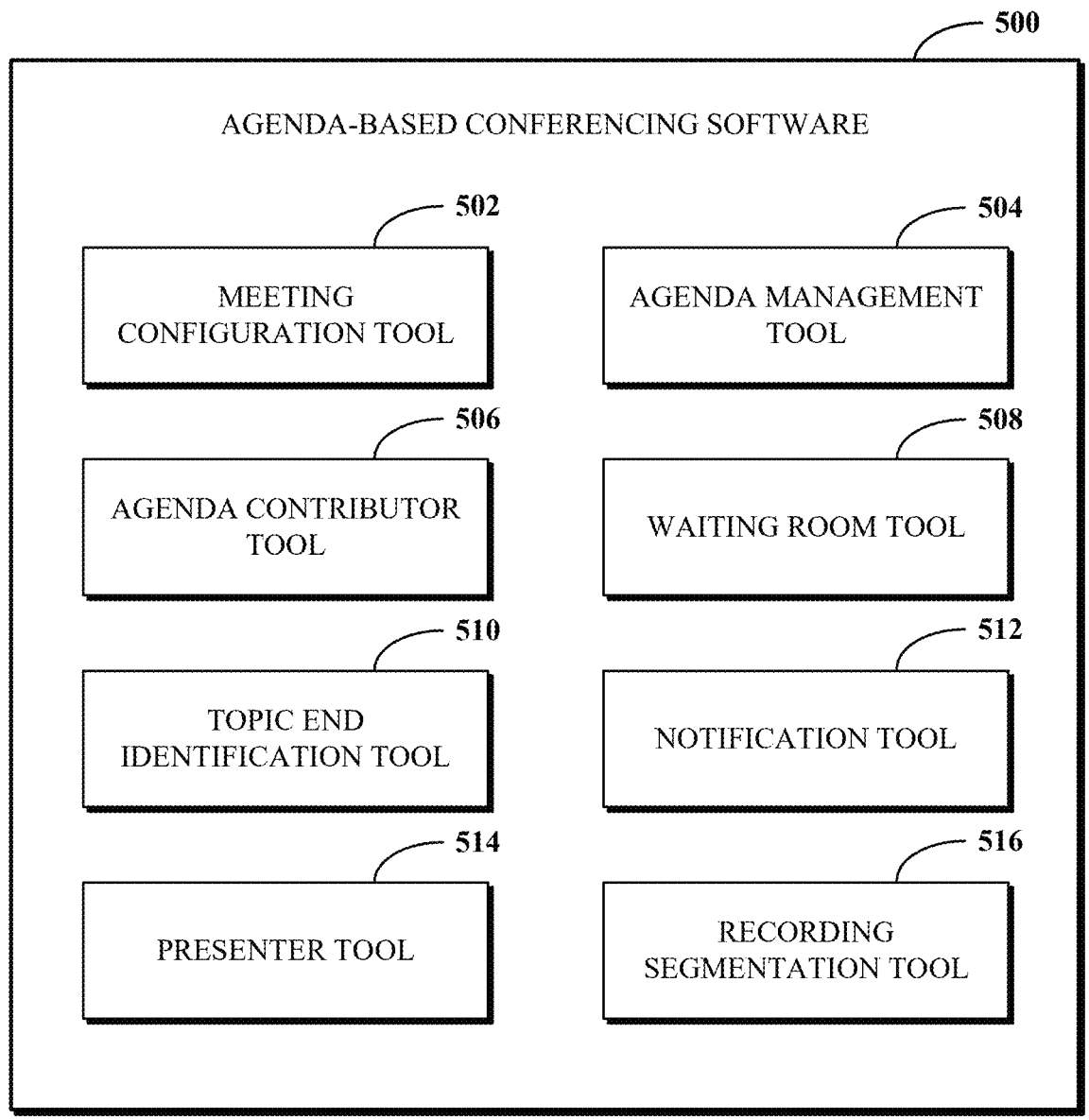
FIG. 5 is a block diagram of example functionality of an agenda-based conferencing software of a software platform.

FIG. 5 is a block diagram of example functionality of an agenda-based conferencing software 500 of a software platform, which may, for example, be the conferencing system 400 shown in FIG. 4. The agenda-based conferencing software 500 is run at a server, which may, for example, be a server of the conferencing software 406 shown in FIG. 4 or another server of a software platform with which the agenda-based conferencing software 500 is used (e.g., the software platform 300 shown in FIG. 3). For example, the agenda-based conferencing software 500 may represent software functionality provided by or included in the conferencing system 400 shown in FIG. 4.

The agenda-based conferencing software 500 includes tools, such as programs, subprograms, functions, routines, subroutines, operations, executable instructions, and/or the like for, inter alia, and as further described below, agenda-based management of virtual conferences, which may be audio-only or audio-visual (i.e., video-enabled) conferences. The agenda-based conferencing software 500 enables users to add (e.g., propose) new agenda items to a future virtual conference and/or register their interest in particular agenda items. The agenda-based conferencing software 500 manages the process of admitting users to the virtual conference at the appropriate time or sending notifications to attend based on the associations of users to specific agenda items. Aspects of the agenda-based conferencing software 500 are further described and illustrated with respect to FIGS. 5-8B.

"User," as used herein, refers to a person associated with a client and is enabled or configured to interact with the agenda-based conferencing software 500 and/or the conferencing software. As such, a user can be any participant or attendee of a conference managed by the agenda-based conferencing software 500, including but not limited to hosts, permanent invitees (described below), and topic-based invitees (described below). A user may interact with the conferencing software through a user interface to, inter alia, join conferences, contribute agenda items, and participate in discussions pertinent to their role or interests within the conference. The term encompasses individuals who engage with the agenda-based conferencing software 500 in various capacities, from those who have full access to the conference as permanent invitees to those who are granted selective access to specific topics based on predetermined associations with agenda items.

At least some of the tools of the agenda-based conferencing software 500 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the agenda-based conferencing software 500 includes a meeting configuration tool 502, an agenda management tool 504, an agenda contributor tool 506, a waiting room tool 508, an agenda item end identification tool 510, a notification tool 512, a presenter tool 514, and a recording segmentation tool 516. In some implementations, some of the tools may be combined, some of the tools may be split into more tools, or a combination thereof. In some implementations, more or fewer tools may be included in the agenda-based conferencing software 500.

The meeting configuration tool 502 enables configuration of parameters of a virtual conference to be hosted by the agenda-based conferencing software 500. In an example, the meeting configuration tool 502 may provide user interfaces that a conference host can use to configure the parameters. In an example, the meeting configuration tool 502 may enable programmatic configuration of the parameters of a virtual conference. For example, the conference host may configure a meeting via a calendaring software, which may use Application Programmer Interfaces (APIs) of the meeting configuration tool 502 to cause a virtual conference to be configured in the agenda-based conferencing software 500. The meeting configuration tool 502 may facilitate the selection of date and time, selection of conference participants, and configuration of meeting specifics, such as duration and recurring schedule. The meeting configuration tool 502 enables configuration of one or more virtual waiting rooms associated with a conference. Examples of operations of the meeting configuration tool 502 are further illustrated with respect to FIGS. 8A-8B.

The agenda management tool 504 enables the creation, editing, and organization of agenda items for a conference. The agenda management tool 504 may provide functionality for the conference host to allocate time slots, prioritize agenda items, and reorder agenda items. The agenda management tool 504 enables the conference host to view agenda items proposed by other users and to accept, as agenda items of the conference, at least some of the proposed agenda items. As such, management of agenda items may include adding, accepting proposed agenda items, rejecting proposed agenda items, and/or configuration of agenda items. Examples of operations of the agenda management tool 504 are further illustrated with respect to FIGS. 8A-8B.

The agenda contributor tool 506 enables users to submit agenda items (e.g., topics) for discussion during a conference. That is, the agenda contributor tool 506 enables users to suggest agenda items, provide input on the discussion points, and estimate required discussion time. A user proposing an agenda item may already be an invitee (e.g., a permanent invitee) or may not be an invitee of the conference. To illustrate, a user desiring to discuss a topic with the invitees of the conference may propose an agenda item which, upon approval, could lead to an invitation to join the conference. Such a user, who is not a permanent invitee, becomes a topic-based invitee. That is, if the conference host accepts the proposed agenda item, then the proposing user may become a topic-based invite of the conference.

The waiting room tool 508 enables waiting rooms (i.e., virtual holding areas) for participants prior to their active involvement in a conference. The waiting room tool 508 is configured to manage the flow of participants into a conference based on their associations with agenda items. That is, the waiting room tool 508 is configured to control when users, placed in one or more waiting rooms, are brought into (i.e., are joined to) the conference. The waiting room tool 508 can orchestrate timing such that users are introduced into the conference when their relevant agenda items are, or are about to be, addressed.

When a request to join a conference is received from a device of a user, the device establishes a connection with the agenda-based conferencing software 500, which may be achieved using a protocol that facilitates real-time audio and video communications. The protocol may be WebRTC, which can facilitate real-time audio and video communications directly within web browsers. As part of this initial connection, the agenda-based conferencing software 500 may authenticate the user.

The waiting room tool 508 evaluates whether the participant is to be placed in a waiting room based on explicit indicators or predefined conference settings, such as privacy configurations. In an example, the request may include an indication (e.g., a parameter) that causes the waiting room tool 508 to determine to place the user in a waiting room. That is, the request form the participant may indicate their intent to join early without engaging in unrelated discussions. Operations of the waiting room tool 508 are further described with respect to FIG. 6.

The waiting room tool 508 may determine to place the user in a waiting room in the case that the conference (or, equivalently, the conference agenda) is configured to be a private or closed conference. As such, the user is only joined to the conference when an agenda item associated with the user is discussed and until then, the waiting room tool 508 places the user in a waiting room. If the user device is connected to the waiting room, the device maintains a connection to the agenda-based conferencing software 500, which may be sustained using technologies such as, but not limited to, WebSockets or Server-Sent Events, which allow for efficient, real-time updates about the status of the waiting room and notification of when the participant can join the conference.

Based on monitoring the progression of agenda items, such as by the agenda item end identification tool 510, the waiting room tool 508 may be directed to join the device to the conference. That is, when it is time for a participant in the waiting room to join the main conference session—determined by their associated agenda item—the waiting room tool 508 initiates a transition to upgrade the participant's connection to support full participation in the conference, including at least one of audio and video. Transitioning the connection may include establishing a media connection to the conference, enabling the participant to engage in interactive features of the conference, such as screen sharing, audio commentary, and video presence.

In some implementations, a waiting room enabled by the waiting room tool 508 may be similar to a virtual conference. As such, waiting users are enabled to communicate with one another using, at least one of, an audio channel or a text (e.g., chat) channel. In some implementations, each waiting room may be associated with a specific agenda item, allowing for the organization of multiple, distinct waiting rooms based on the agenda items of the conference. As such, participants can be grouped by their interests in (or associations to) particular agenda items before joining the conference. When it is time for a user to transition from a waiting room to the conference in alignment with their associated agenda item, the waiting room tool 508 connects the user's audio channel to the conference and may also enable the video channel, facilitating full participation in the conference session.

The agenda item end identification tool 510 determines when a discussion on a current agenda item is nearing completion or when a discussion on the next agenda item is about to start. In an example, intelligent algorithms may be used. For example, the agenda item end identification tool 510 may include a machine learning model trained to identify when discussion on a topic is about to complete. By analyzing cues from the ongoing conversation, such as the meeting's progression and keyword detection, the agenda item end identification tool 510 can alert the host, participants, and/or waiting users of impending transitions between agenda items (e.g., the impending start of a next agenda item), aiding in the maintenance of the meeting's prescribed schedule. In another example, the agenda item end identification tool 510 may receive an explicit indicator from the host (or another privileged participant) of the impending start of the next agenda item. The agenda item end identification tool 510 is further described with respect to FIG. 7.

The notification tool 512 is configured to facilitate timely and efficient communication with users based on their current engagement status with the conference. For users positioned within a waiting room, the notification tool 512 issues a notification, which may be auditory and/or visual (e.g., a dialog box displayed at the device of the waiting user), indicating the imminent transfer of the user into the main conference session. The precise timing for this action can be determined by the agenda item end identification tool 510. To illustrate, the notification may essentially state, "You will be placed in the conference in 2 minutes." In an example, the notification tool 512 may cause a countdown timer and the user is added to the conference at the expiration of the countdown timer. As further described herein, additional time may be allocated to an agenda item. As such, the countdown time is updated to reflect the additional allocated time.

The notification tool 512 may generate a dynamic participation schedule based on associations of conference invitees to the agenda items. The notification tool 512 may transmit notifications to the conference invitees to join the virtual conference based on times indicated in the dynamic participation schedule. The notifications can be as described above.

For users not present (i.e., not waiting) in a waiting room, the notification tool 512 may transmit (e.g., dispatch) an alert through alternative communication channels, such as email or a chat message. The alert notifies a user of the forthcoming discussion of their associated agenda item. The alert may incorporate a direct mechanism (e.g., a hyperlink) to facilitate immediate access by the user to the conference. For an already active participant within the conference, the notification tool 512 does not send a notification to the participant, recognizing their ongoing and already active involvement.

The presenter tool 514 assigns and manages presenter privileges to participants who are designated to lead specific agenda items. The presenter tool 514 automatically grants the presenter permission at appropriate times to appropriate users. The presenter permission enables a user to share content (screen or media content) in the conference. When a participant, identified either as a presenter or having requested to present on a particular agenda item, is transitioned from a waiting room to the conference, they are automatically granted the presenter permission. Similarly, when a user joins the conference based on an impending start of an agenda item associated therewith, the user can be assigned the presenter permission. As such, the presenter tool 514 streamlines the process of transitioning between presenter and maintains the intended order of presentations.

The recording segmentation tool 516 can be configured to automatically divide a conference recording of a conference into distinct sections based on the agenda items discussed. This enables participants to easily navigate and review the content of the conference, focusing on specific discussions of interest. As such, the recording segmentation tool 516 enhances the post-conference experience by simplifying access to relevant portions of the conference. The recording segmentation tool 516 may be configured to either generate separate recordings for each agenda item, allowing users to access only the segments relevant to them, or create a single comprehensive recording with markers or chapters that users can navigate to view specific agenda items. The segmentation can be based on timestamps correlated with the start and end times of each agenda item, as detected by the agenda item end identification tool 700, described with respect to FIG. 7, or may be based on audio cues and keyword recognition to determine the transitions between topics.

Figure 6:
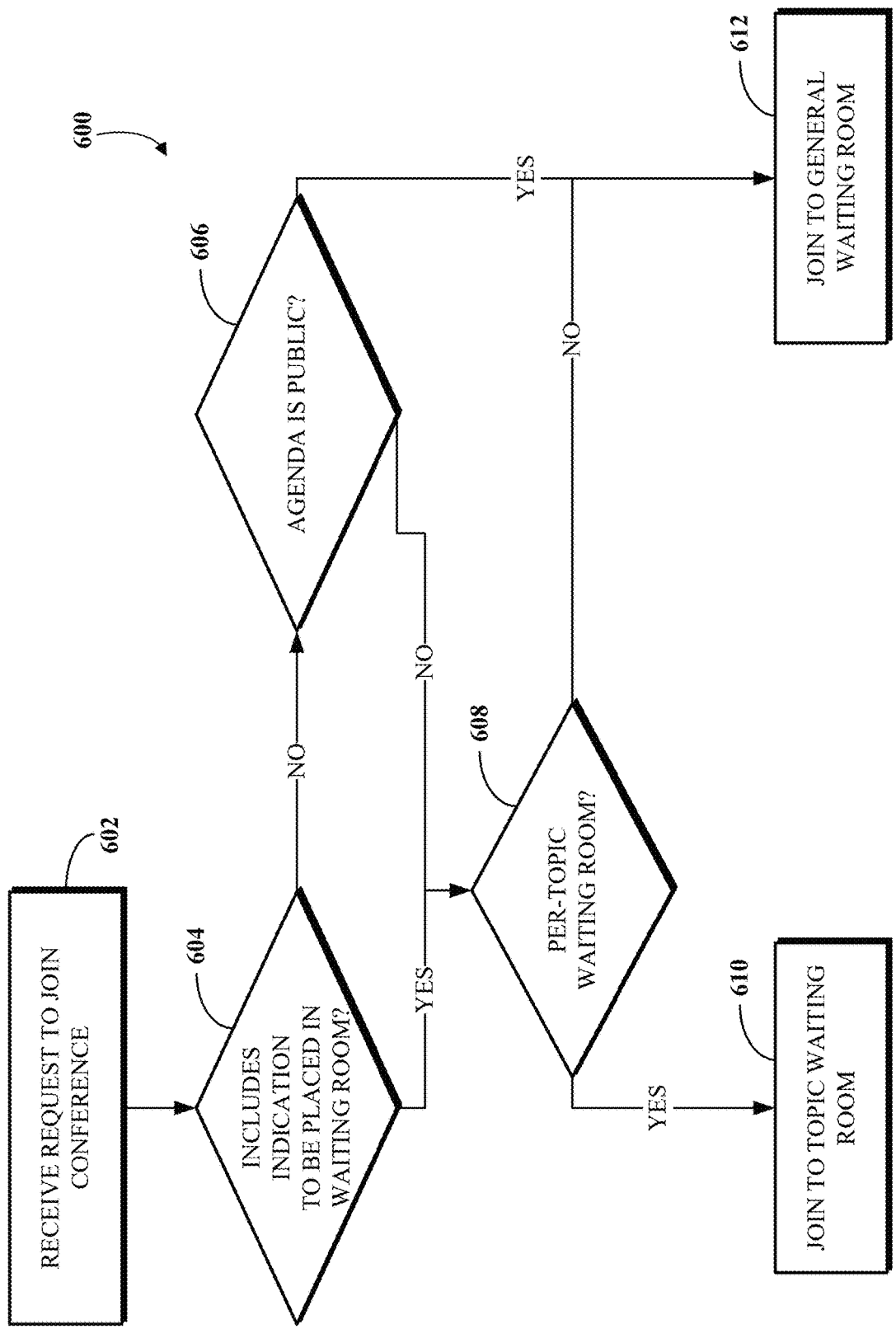
FIG. 6 is an example of a flowchart of a technique of joining a user to a conference.

FIG. 6 is an example of a flowchart of a technique 600 of joining a user to a conference. The technique 600 can be implemented by a waiting room tool of an agenda-based conferencing software, such as the waiting room tool 508 of the agenda-based conferencing software 500 of FIG. 5.

At 602, a request to join a conference is received. The request may be received from a client associated the user, which can be one of the clients 408 or 410 of FIG. 4. In an example, the request may include an indication that the user is to be placed in a virtual waiting room until an agenda item associated with the user is to be discussed. The user may want to be placed in the waiting room so that they can continue with other tasks and join the conference only when discussions relevant to their expertise or interest are taking place, thereby optimizing their productivity and avoiding the need to attend unrelated portions of the meeting. As such, users can manage their time more effectively, contributing to the overall efficiency of the virtual meeting by reducing idle time and ensuring focused participation.

The agenda-based conferencing software may enable the user to provide such an indication through a user interface. For example, as part of the conference joining process, the user interface may present options for the user to customize their participation. To illustrate, the user may interact with a user interface control (e.g., check a box or select from a dropdown menu) to indicate their desire to be placed in a waiting room. In an example, the user interface may offer a list of agenda items from which the user can select the ones in which they are interested. As such, the user can register an interest in agenda items at the time of joining the conference. The user can then be placed in a virtual holding space designated for at least one of those specific topics. That is, the device of the user can be joined to the virtual holding space. The user may further be able to set preferences for receiving notifications, such as auditory alerts or on-screen prompts, to signal when their chosen topics are about to start.

At 604, the request is evaluated to determine whether it includes the indication that the user is to be placed in a virtual waiting. If such an indication is not included, the technique 600 proceeds to 606; otherwise the technique proceeds to 608. At 606, the technique 600 determines whether the agenda associated with the conference is public. If the agenda is not public, the technique 600 proceeds to 608; otherwise, if the agenda is public, the user is joined to a general waiting room, at 612. The general waiting room is where all waiting users are placed regardless of associations between users and agenda items.

At 608, the technique 600 determines whether the conference is configured with topic-specific waiting rooms. As such, waiting rooms associated with the conference can be segmented according to the agenda items of the conference. If the conference is configured with topic-specific waiting rooms, then the user is joined to the waiting room corresponding to their selected agenda item, at 610; otherwise, the user is joined to a general waiting room, at 612.

In situations where the user is associated with multiple agenda items within the conference, the technique 600 may implement a queue system within the waiting room tool to manage their participation across various topics. For example, upon determining the user's selected topics at 608, the technique 600 may sequence the entry of the user into respective topic-specific waiting rooms based on the chronological order of the agenda items. To illustrate, assuming that the user is associated with the second and fourth agenda items of a conference agenda and that the conference is configured with topic-specific waiting rooms, then when the user first joins the conference, the user may be placed in the waiting room associated with the second topic, and is then joined to the conference when the second agenda item is about to be discussed. Once their discussion for the second topic concludes, the user may be returned to a waiting room associated with the fourth topic. At the conclusion of the second topic the user may be removed from the conference if the user transmits a request to disconnect from the conference, if the agenda is not public (in which case the technique 600 may automatically remove the user from the conference), or the host disconnects the user from the conference.

If the conference (or agenda) is public, then a user is moved to the conference a predefined amount of time (e.g., a predefined threshold within a current time) prior to the termination of the current agenda item (or start of the next agenda item) in the case that the user is associated with the next agenda item. The predefined amount of time (e.g., a predefined threshold time) may be fixed (e.g., 2 minutes) or may be chosen by the user as a user configuration or a user preference. If the conference (or agenda) is private, then the user is not moved from the waiting room to the conference until the end of the current agenda item. The termination of the current agenda item (or start of the next agenda item) can be identified as described with respect to FIG. 7.

Figure 7:
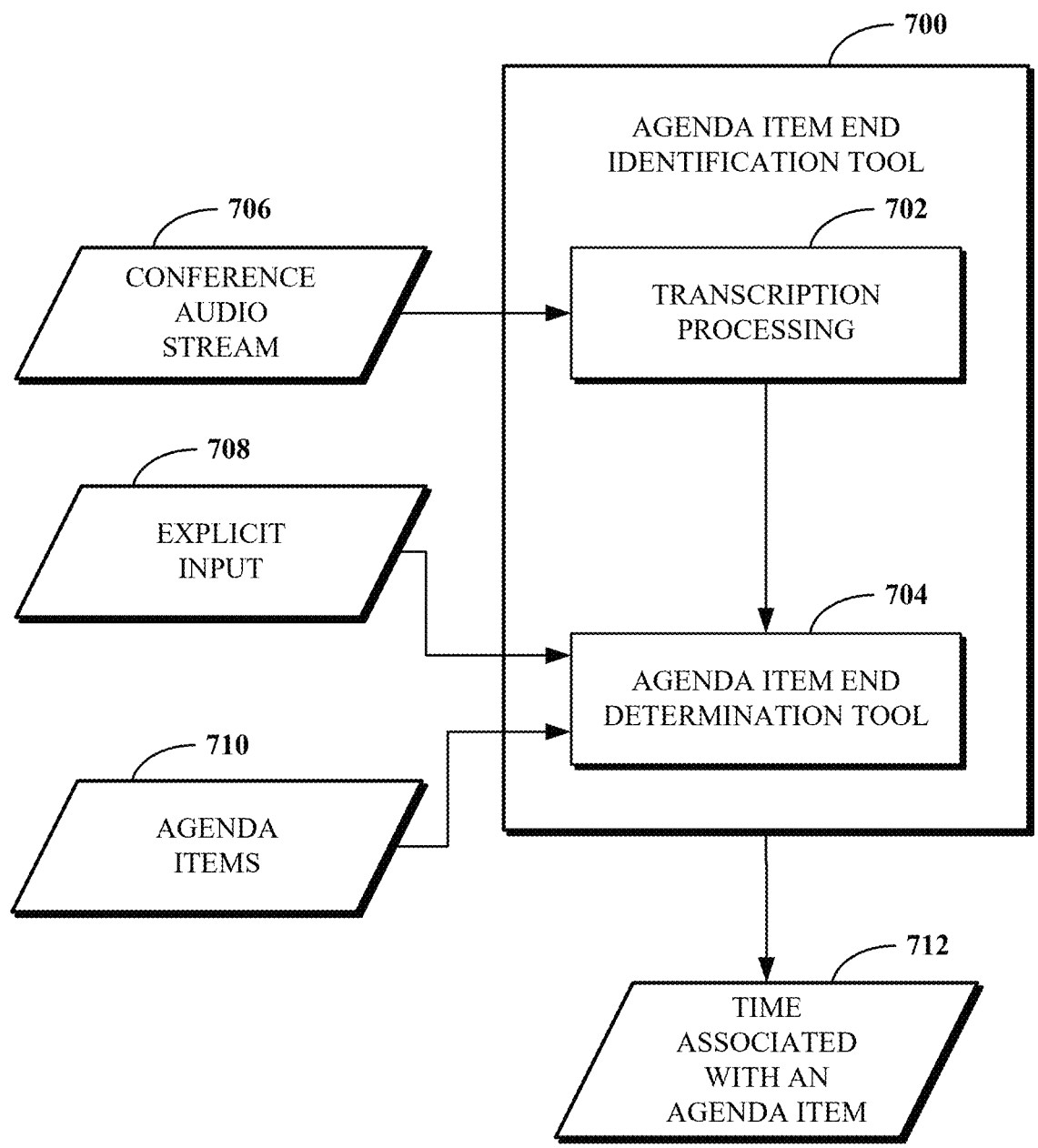
FIG. 7 is a block diagram of an example of an agenda item end identification tool of an agenda-based conferencing software.

FIG. 7 is a block diagram of an example of an agenda item end identification tool 700 of an agenda-based conferencing software. The agenda item end identification tool 700 can be implemented by an agenda-based conferencing software, which may, for example, be agenda-based conferencing software 500 shown in FIG. 5. As such, the agenda item end identification tool 700 can be the agenda item end identification tool 510 shown in FIG. 5. The agenda item end identification tool 700 includes a transcription processing tool 702, and an agenda item end determination tool 704.

The agenda item end identification tool 700 may receive as input a conference audio stream 706, an explicit input 708, and agenda items 710 and generates a time associated with an agenda item 712 as output. The time associated with an agenda item 712 may be an expected end time for a current agenda item being discussed or, equivalently, an expected start time of the next agenda item.

The conference audio stream 706 can be the real-time audio feed of spoken dialogue and sounds occurring during the conference. The conference audio stream 706 may be captured by microphones and other audio input devices at the conference's physical location or via remote participants' devices. The conference audio stream 706 may be encoded and received by the agenda item end identification tool 700, where it is received by the transcription processing tool 702.

The explicit input 708 can be an input that is received from a conference participant, such as the host or a facilitator of the conference. The explicit input 708 may indicate an extension of time for a current agenda item (e.g., the agenda item being discussed at the time that the input is received). To illustrate, via a user interface associated with the conference, the conference participants may indicate (e.g., assert) that the current agenda item will require, for example, an additional N (e.g., 10) minutes of discussion beyond the allotted time. In an example, the explicit input 708 may signal that the conversation on the current topic is concluding, suggesting that the discussion will terminate in the next M (e.g., 2) minutes. In another example, the explicit input 708 may indicate a time that the discussion of the next agenda item may begin. The explicit input 708 can be provided via a user interface associated with the conference. In an example, the explicit input may be an audio command provided by the conference participant to the agenda item end identification tool 700.

The agenda items 710 are agenda items identified for the conference. The agenda items 710 may, for example, be included in an agenda generated using an agenda management tool, for example, the agenda management tool 504 shown in FIG. 5. The agenda items 710 can be associated with the conference such as described with respect to the agenda management tool 504 and/or the agenda contributor tool 506 of FIG. 5.

The transcription processing tool 702 generates a textual transcription of the conference audio stream 706. The textual transcription enables a text-based analysis of the conference dialogue, providing a means to detect cues or keywords that signify transitions or conclusions of agenda items (i.e., conclusions of discussions of the agenda items).

The agenda item end determination tool 704 determines an end time of a current agenda item or a start of a next agenda item based on inputs from the textual transcription obtained by the transcription processing tool 702, the agenda items 710, or the explicit input 708. The agenda item end determination tool 704 may continuously monitor the progression of discussion, aligning it with the predefined agenda. The agenda item end determination tool 704 may be or include a machine learning model that is trained to learn patterns of speech and keywords that commonly indicate the impending closing (e.g., end) or closing of agenda items and an estimated time until the closing of the agenda item and start of the next agenda item.

The machine learning model can be used to determine that a discussion of an agenda item is nearing completion based on the transcription generated in real-time. For example, the machine learning model can be trained to recognize conversational context and dynamics, such as to understand when the subject of a conversation relates to a completion of an agenda item. For example, spoken input captured from one or more of the participants during the first multi-participant communication about an agenda item being done, wrapped up, or completed, or otherwise indicating to move on from the first agenda item without related spoken input indicating to come back to the first agenda item later, may be identified by the machine learning model as indicating that the agenda item is about to or is complete. Thus, the machine learning model can predict when a current agenda item is likely to wrap up.

The agenda item end determination tool 704 may also use the explicit input 708 to identify the end time of a current agenda item and/or, equivalently, identify a start time of a next agenda item. The time associated with an agenda item 712 can be provided as a relative time (such as in seconds or minutes) from a current time that the time associated with an agenda item 712 is output.

FIG. 8A is an example of a user interface 800 illustrating a configuration of a conference where the conference (or agenda) is configured as being private. As mentioned above, a private conference (or agenda) can mean that only selected participants have access to the details of the meeting, or certain agenda items, and may only join the conference at their allotted times or when specific topics of interest to them are being discussed. The user interface 800 can be generated by a meeting configuration tool, such as the meeting configuration tool 502 shown in FIG. 5. The user interface 800 may be displayed a device of and is usable by a conference host to configure a conference. The user interface 800 includes user interface controls that enable the conference participant to configure a title for the conference and to provide scheduling/timing details for the conference.

Via a user interface element 802, the host can indicate whether the agenda (and equivalently the conference itself) is private or not. As shown, the conference is being configured as private since the user interface element 802 (e.g., a checkbox) is not checked. If an agenda is private, then certain attendees (or invitees) of the conference may not be able to join the conference except when agenda items associated therewith are being or about to be discussed. In contrast, a public agenda indicates that meeting invitees can join at any time during the meeting for any topic.

A field 804 lists the current invitees of the conference. The list of current invitees includes permanent invitees (which may be indicated by an icon 806A) and topic-based invitees (which may be indicated by an icon 806B). A permanent invitee is authorized to attend the entire conference regardless of their association with specific agenda items. Conversely, a topic-based invitee is added to the conference based on an association with a particular agenda item. For example, the meeting configuration tool may transmit a meeting invitation to a topic-based attendee for an instance of a recurring conference if the topic-based attendee is associated with an agenda item that is scheduled to be discussed in that particular instance. This ensures that attendees are notified and can join the conference when topics of their interest or expertise are addressed, optimizing the relevance and efficiency of their participation.

Via a user interface control 808, the host can configure the type of waiting room(s) to associate with the conference. Waiting room type options 810A, 810B, and 810C allow the host to choose between having one general waiting room for all participants, separate waiting rooms for each agenda item, or no waiting room at all, respectively. The room type option 810C indicates that all participants have immediate access to the conference upon joining, without any preliminary holding period. Such an option may be desirable or suitable for smaller or less formal meetings where no sensitive/private topics are to be discussed. In an example, if the agenda is configured to be private, then the room type option 810C may not be selectable (e.g., is not available for selection).

A list of agenda items 812 (shown as a table) illustrates the current agenda items for the next occurrence (instance) of a conference. A row 814 illustrates that an agenda item labeled "TOPIC 2" was suggested (e.g., added) by the user indicated in a cell 816. A cell 818 indicates that additional invitees are suggested with respect to the agenda item. The additional invitees may be added by the contributor of the agenda item, by the host, or by some other user. A cell 820 indicates the level of urgency for the agenda item. A cell 822 indicates the requested discussion time for the agenda item. A cell 824 shows a list of the users who have registered an interest in the agenda item. A checkbox in cell 826, which is shown as checked, indicates that the host has accepted the agenda item into the official agenda of the conference. In an example, only permanent invitees may be configured to register interests in agenda items.

FIG. 8B is an example of a user interface 850 illustrating a configuration of a conference where the conference (or agenda) are configured as being public. Accordingly, the conference is public since the user interface element 802, described above with respect to FIG. 8A, is checked. The user interface 850 also illustrates that the conference host has configured the conference to have one general waiting room for all participants since the option 810A is selected.

Figure 9:
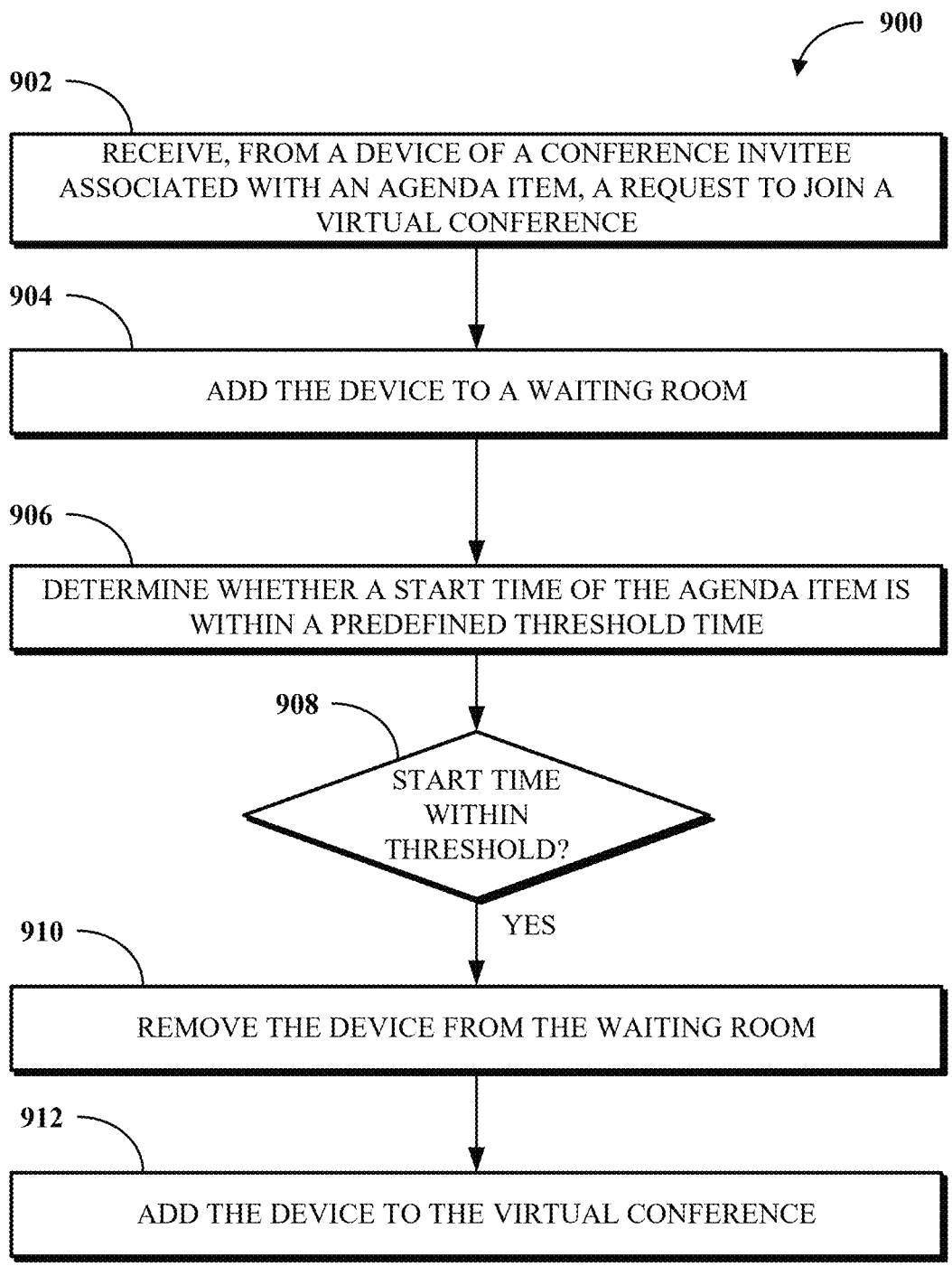
FIG. 9 is a flowchart of an example of a technique for agenda-based virtual conference management.

To further describe some implementations in greater detail, reference is next made to examples of techniques which may be performed by or using a system for agenda-based conference management. FIG. 9 is a flowchart of an example of a technique 900 for agenda-based virtual conference management. The technique 900 can be executed using computing devices, such as the systems, hardware, and software described with respect to FIGS. 1-8B. the technique 900 can be executed by a conferencing software that includes an agenda-based conferencing software, such as the agenda-based conferencing software 500 of FIG. 5. The technique 900 can be performed, for example, by executing a machine-readable program or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations of the technique 900 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a request to join a virtual conference is received from a device of a conference invitee. The virtual conference can be an audio-only conference or can be an audio-video conference. The device can be, for example, the client 408 or the client 410 of FIG. 4. The conference invitee is associated with an agenda item of the virtual conference. The agenda item may be received from the conference invitee or another user as a suggested agenda item. The suggested agenda item may be accepted as an agenda item for the conference, such as described above with respect to FIGS. 8A-8B.

At 904, based on the request and based on the association of the conference invitee with the agenda item, the device is added (e.g., joined) to a waiting room associated with the virtual conference. In an example, the waiting room may be configured to enable communications amongst conference invitees waiting in the waiting room.

The technique 900 identifies a start time of the agenda item associated with the conference invitee. The start can be identified as described above with respect to the agenda item end identification tool 700 of FIG. 7. As such, in an example, the start time may be identified using (e.g., by) a machine learning model. In another example, the start time may be received or identified based on an input, such from the host or a facilitator of the virtual conference, indicating the start time of the agenda item. In an example, an update on changes in a schedule of the virtual conference may be received, such an addition of time to a current agenda item. This in turn results in the dynamic update to the start time of the agenda item. For example, the start time of the agenda item may be adjusted based on an input from at least one conference invitee.

At 906, the technique 900 determines whether the start time of the agenda item is within a predefined threshold time from a current time (e.g., the time that the determination is made). The predefined threshold time can be as described above. At 908, if the start time is within the predefined threshold from the current time, then the technique 900 proceeds to 910; otherwise, the technique 900 may wait (not explicitly shown) until the start time is within a predefined threshold. At 910, the device is removed from the waiting room and at 912, the device is added (e.g., joined) to the virtual conference. In an example, if the conference invitee is associated with the agenda item as a presenter, then the technique 900 may grant presenter privileges to the conference invitee at the time that the device is added to the virtual conference.

The technique 900 may enable the addition of additional agenda items during a predefined time frame prior to a start of the virtual conference. The technique 900 may generate a dynamic participation schedule based on associations of conference invitees to agenda items of the virtual conference and may notify at least some of the conference invitees to join the virtual conference based on times indicated in the dynamic participation schedule. In an example, the notification may be provided in the form of a countdown timer. As such, a user interface may be provided displaying a countdown timer until the start time of the agenda item. In an example, a reminder notification may be transmitted to the device of the conference invitee a predetermined time before the start time of the agenda item. In an example, a notification may be transmitted to another conference invitee via an email or a chat communication channel about the start time of the agenda item. The notification may include a direct link to join the virtual conference.

In an example, the technique 900 may segment a recording of the virtual conference according to agenda items of the virtual conference, such as described above with respect to recording segmentation tool 516 of FIG. 5. In an example, a calendar of the conference invitee may be updated with the start time of the agenda item. For example, the conferencing software may transmit a request to a calendaring application to update the start time.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method. The method includes receiving, by a conferencing software from a device of a conference invitee, a request to join a virtual conference, where the conference invitee is associated with an agenda item of the virtual conference. The method also includes, based on the request to join the virtual conference, adding, by the conferencing software, the device to a waiting room associated with the virtual conference. The method also includes determining, by the conferencing software, whether a start time of the agenda item is within a predefined threshold time from a current time. The method also includes, in response to determining that the start time of the agenda item is within the predefined threshold time from the current time: removing, by the conferencing software, the device from the waiting room; and adding, by the conferencing software, the device to the virtual conference. Other embodiments of this aspect include corresponding computer systems, apparatus, and computer programs recorded on one or more computer storage devices, each configured to perform the actions of the methods.

Implementations may include one or more of the following features.

The method where adding, by the conferencing software, the device to the virtual conference may include determining, by the conferencing software, that the conference invitee is associated with the agenda item as a presenter; and in response to determining that the conference invitee is associated with the agenda item as the presenter, granting, by the conferencing software, presenter privileges to the conference invitee.

The method may include enabling, by the conferencing software, an addition of additional agenda items during a predefined time frame prior to a start of the virtual conference.

The method may include generating, by the conferencing software, a dynamic participation schedule based on associations of conference invitees to agenda items of the virtual conference; and notifying, by the conferencing software, at least some of the conference invitees to join the virtual conference based on times indicated in the dynamic participation schedule.

The method may include using, by the conferencing software, a machine learning model to identify the start time of the agenda item.

The method may include receiving, by the conferencing software, an input indicating the start time of the agenda item.

The method may include segmenting, by the conferencing software, a recording of the virtual conference according to agenda items of the virtual conference.

Implementations of the described techniques may include hardware, a method or process, or computer software on a computer-accessible medium.

One general aspect includes a system. The system includes one or more memories. The system also includes one or more processors. The processors are configured to execute instructions stored in the one or more memories to receive, by a conferencing software from a device of a conference invitee, a request to join a virtual conference, where the conference invitee is associated with an agenda item of the virtual conference; based on the request to join the virtual conference, add, by the conferencing software, the device to a waiting room associated with the virtual conference; determine, by the conferencing software, whether a start time of the agenda item is within a predefined threshold time from a current time; and in response to determining that the start time of the agenda item is within the predefined threshold time from the current time: remove, by the conferencing software, the device from the waiting room; and add, by the conferencing software, the device to the virtual conference.

Implementations may include one or more of the following features.

The system where the one or more processors may be configured to execute instructions stored in the one or more memories to provide, by the conferencing software, a user interface that displays a countdown timer until the start time of the agenda item.

The one or more processors may be configured to execute instructions stored in the one or more memories to transmit, by the conferencing software, a reminder notification to the device of the conference invitee a predetermined time before the start time of the agenda item.

The one or more processors may be configured to execute instructions stored in the one or more memories to update, by the conferencing software, a calendar of the conference invitee with the start time of the agenda item.

The one or more processors may be configured to execute instructions stored in the one or more memories to transmit, by the conferencing software, a notification to another conference invitee via an email or a chat communication channel about the start time of the agenda item, where the notification includes a direct link to join the virtual conference.

The one or more processors may be configured to execute instructions stored in the one or more memories to receive, by the conferencing software, the agenda item as a suggested agenda item from the conference invitee; and receive, by the conference software, an input indicating acceptance of the agenda item.

The instructions to identify the start time of the agenda item may include instructions to receive, by the conferencing software, an update on changes in a schedule of the virtual conference; and dynamically update, by the conferencing software, the start time of the agenda item in response to the update.

One general aspect includes one or more non-transitory computer readable media storing instructions operable to cause one or more processors to perform operations. The operations include receiving, by a conferencing software from a device of a conference invitee, a request to join a virtual conference, where the conference invitee is associated with an agenda item of the virtual conference. The operations also include based on the request to join the virtual conference, adding, by the conferencing software, the device to a waiting room associated with the virtual conference. The operations also include determining, by the conferencing software, whether a start time of the agenda item is within a predefined threshold time from a current time. The operations also include, in response to determining that the start time of the agenda item is within the predefined threshold time from the current time: removing, by the conferencing software, the device from the waiting room; and adding, by the conferencing software, the device to the virtual conference.

Implementations may include one or more of the following features.

The one or more non-transitory computer readable media where the operations may include adjusting, by the conferencing software, the start time of the agenda item based on an input from at least one conference invitee.

The start time of the agenda item may be identified by a machine learning model.

The operations may include configuring the waiting room to enable communications amongst conference invitees waiting in the waiting room.

The operations may include updating a countdown timer displayed at the device of the conference invitee in response to an update to the start time of the agenda item.

The virtual conference may be an audio-only conference.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving, by a conferencing software from a device of a conference invitee, a request to join a virtual conference, wherein the conference invitee is associated with an agenda item of the virtual conference;
   based on the request to join the virtual conference, adding, by the conferencing software, the device to a waiting room associated with the virtual conference;
   determining, by the conferencing software, whether a start time of the agenda item is within a predefined threshold time from a current time; and
   in response to determining that the start time of the agenda item is within the predefined threshold time from the current time:
      removing, by the conferencing software, the device from the waiting room; and
      adding, by the conferencing software, the device to the virtual conference.

2. The method of claim 1, wherein adding, by the conferencing software, the device to the virtual conference comprises:
   determining, by the conferencing software, that the conference invitee is associated with the agenda item as a presenter; and
   in response to determining that the conference invitee is associated with the agenda item as the presenter, granting, by the conferencing software, presenter privileges to the conference invitee.

3. The method of claim 1, further comprising:
   enabling, by the conferencing software, an addition of additional agenda items during a predefined time frame prior to a start of the virtual conference.

4. The method of claim 1, further comprising:
   generating, by the conferencing software, a dynamic participation schedule based on associations of conference invitees to agenda items of the virtual conference; and
   notifying, by the conferencing software, at least some of the conference invitees to join the virtual conference based on times indicated in the dynamic participation schedule.

5. The method of claim 1, further comprising:
   using, by the conferencing software, a machine learning model to identify the start time of the agenda item.

6. The method of claim 1, further comprising:
   receiving, by the conferencing software, an input indicating the start time of the agenda item.

7. The method of claim 1, further comprising:
   segmenting, by the conferencing software, a recording of the virtual conference according to agenda items of the virtual conference.

8. A system, comprising:
   one or more memories; and
   one or more processors, the one or more processors configured to execute instructions stored in the one or more memories to:
      receive, by a conferencing software from a device of a conference invitee, a request to join a virtual conference, wherein the conference invitee is associated with an agenda item of the virtual conference;
      based on the request to join the virtual conference, add, by the conferencing software, the device to a waiting room associated with the virtual conference;
      determine, by the conferencing software, whether a start time of the agenda item is within a predefined threshold time from a current time; and
      in response to determining that the start time of the agenda item is within the predefined threshold time from the current time:
         remove, by the conferencing software, the device from the waiting room; and
         add, by the conferencing software, the device to the virtual conference.

9. The system of claim 8, wherein the one or more processors are further configured to execute instructions stored in the one or more memories to:
   provide, by the conferencing software, a user interface that displays a countdown timer until the start time of the agenda item.

10. The system of claim 8, wherein the one or more processors are further configured to execute instructions stored in the one or more memories to:
    transmit, by the conferencing software, a reminder notification to the device of the conference invitee a predetermined time before the start time of the agenda item.

11. The system of claim 8, wherein the one or more processors are further configured to execute instructions stored in the one or more memories to:
    update, by the conferencing software, a calendar of the conference invitee with the start time of the agenda item.

12. The system of claim 8, wherein the one or more processors are further configured to execute instructions stored in the one or more memories to:
    transmit, by the conferencing software, a notification to another conference invitee via an email or a chat communication channel about the start time of the agenda item, wherein the notification includes a direct link to join the virtual conference.

13. The system of claim 8, wherein the one or more processors are further configured to execute instructions stored in the one or more memories to:
    receive, by the conferencing software, the agenda item as a suggested agenda item from the conference invitee; and
    receive, by the conferencing software, an input indicating acceptance of the agenda item.

14. The system of claim 8, wherein the instructions to identify the start time of the agenda item comprises instructions to:

receive, by the conferencing software, an update on changes in a schedule of the virtual conference; and dynamically update, by the conferencing software, the start time of the agenda item in response to the update.

15. One or more non-transitory computer readable media storing instructions operable to cause one or more processors to perform operations comprising:

receiving, by a conferencing software from a device of a conference invitee, a request to join a virtual conference, wherein the conference invitee is associated with an agenda item of the virtual conference;

based on the request to join the virtual conference, adding, by the conferencing software, the device to a waiting room associated with the virtual conference;

determining, by the conferencing software, whether a start time of the agenda item is within a predefined threshold time from a current time; and in response to determining that the start time of the agenda item is within the predefined threshold time from the current time:

removing, by the conferencing software, the device from the waiting room; and adding, by the conferencing software, the device to the virtual conference.

16. The one or more non-transitory computer readable media of claim 15, wherein the operations comprise:

adjusting, by the conferencing software, the start time of the agenda item based on an input from at least one conference invitee.

17. The one or more non-transitory computer readable media of claim 15, wherein the start time of the agenda item is identified by a machine learning model.

18. The one or more non-transitory computer readable media of claim 15, wherein the operations comprise:

configuring the waiting room to enable communications amongst conference invitees waiting in the waiting room.

19. The one or more non-transitory computer readable media of claim 15, wherein the operations comprise:

updating a countdown timer displayed at the device of the conference invitee in response to an update to the start time of the agenda item.

20. The one or more non-transitory computer readable media of claim 15, wherein the virtual conference is an audio-only conference.

* * * * *